(12) United States Patent
Fleehart et al.

(10) Patent No.: US 6,820,256 B2
(45) Date of Patent: Nov. 16, 2004

(54) SYSTEM AND METHOD FOR WHOLE-SYSTEM PROGRAM ANALYSIS

(75) Inventors: Timothy G. Fleehart, Woodinville, WA (US); Jonathan D. Pincus, Bellevue, WA (US); Jeffrey S. Wallace, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 541 days.

(21) Appl. No.: 09/735,856

(22) Filed: Dec. 13, 2000

(65) Prior Publication Data

US 2002/0073403 A1 Jun. 13, 2002

(51) Int. Cl.[7] .............................. G06F 9/45; G06F 9/44
(52) U.S. Cl. ...................... 717/155; 717/124; 717/152; 717/154
(58) Field of Search ................................ 717/124, 131, 717/151–156, 159; 707/100, 203; 706/46; 712/214, 219, 223; 714/38

(56) References Cited

U.S. PATENT DOCUMENTS

| | | | | |
|---|---|---|---|---|
| 4,558,413 A | * | 12/1985 | Schmidt et al. ............. 707/203 |
| 5,423,027 A | * | 6/1995 | Jackson ........................ 714/38 |
| 5,875,317 A | * | 2/1999 | Kawasaki ..................... 712/219 |
| 5,941,983 A | * | 8/1999 | Gupta et al. ................. 712/214 |
| 5,978,588 A | * | 11/1999 | Wallace ....................... 717/159 |
| 6,018,747 A | * | 1/2000 | Burns et al. ................. 707/203 |
| 6,260,190 B1 | * | 7/2001 | Ju ................................ 717/156 |
| 6,275,986 B1 | * | 8/2001 | Ewart .......................... 717/126 |
| 6,389,587 B1 | * | 5/2002 | Lewis .......................... 717/151 |
| 6,449,711 B1 | * | 9/2002 | Week .......................... 712/223 |
| 6,487,716 B1 | * | 11/2002 | Choi et al. ................... 717/159 |
| 6,499,023 B1 | * | 12/2002 | Dong et al. .................... 706/46 |
| 6,560,606 B1 | * | 5/2003 | Young ......................... 707/100 |

* cited by examiner

Primary Examiner—Anil Khatri
Assistant Examiner—Trent J Roche
(74) Attorney, Agent, or Firm—Merchant & Gould

(57) ABSTRACT

Defect detection in a software system made of multiple computer program programs is facilitated by using information about cross-program interactions and dependency relationships between programs to analyze the individual programs in such a way that the behavior of the system as a whole is accurately represented. A list of dependency relationships is read in; these dependency relationships are used to determine an order in which the programs should be analyzed. The programs are then analyzed in that order. Information from the analysis of the programs is used to inform the analysis of subsequently-analyzed programs.

78 Claims, 4 Drawing Sheets

SYSTEM AND METHOD FOR WHOLE-SYSTEM PROGRAM ANALYSIS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2000, Microsoft Corp.

FIELD OF THE INVENTION

The invention relates generally to the analysis of computer programs. More particularly, the invention relates to the analysis of computer systems comprised of multiple programs.

BACKGROUND

A large amount of effort in the development of computer programs is spent ensuring the correctness of the completed program. The correctness of a computer program is the degree to which it is free from errors in its specification, design, and implementation. Three common methods for detecting errors in a computer program are compile-time checking, runtime checking, and simulated path execution.

Compile-time checking is the process of evaluating a computer program based on its form, structure, or content. Compile-time checking tests properties that can be established before the execution of a program. One form of compile-time checking, known as syntax checking, verifies compliance with structural or grammatical rules defined for a language. For example, in the context of a computer program written in the well-known C++ programming language, using the statement B+C=A would produce an error because the correct format is A=B+C. Syntax checking is discussed, for example, in Richard Conway and David Gries, *An Introduction to Programming* (Winthrop Publishers, Inc., 1979). Another form of compile-time checking, known as data flow analysis, analyzes the sequence in which data transfer, use, and transformation are performed in a computer program to detect programming errors. Data flow analysis includes the use of control information, which relates to the sequence in which statements are performed in the execution of a computer program. A control flow is also referred to as a control flow path or, more simply, a code path. Data flow analysis can detect such errors as the use of a variable before assignment, two consecutive assignments to a variable, or assigning a value to a variable that is never used.

Compile-time checking techniques are inherently limited in that they do not consider the consequences of actual execution of the computer program in question. Compile-time checking is thus limited to what can be determined without considering the dynamic effects of program execution. For example, the lint compile-time checker available in the SPARCworks™ 3.0.1 programming environment from Sun Microsystems of Mountain View, Calif., analyzes computer code without regard to the dynamic flow of control through the code. This shortcoming causes lint to falsely report values being used before they are initialized, when such is not the case.

Another type of false error reported by compile-time analysis methods is an "apparent" error in instructions through which control flow cannot go. The sequence in which statements are performed often depends on particular values associated with particular variables. Compile-time checking methods generally assume statements are always executed because they cannot determine whether a particular code path is executed or under what specific circumstances program control flows through the code path.

Runtime checking, the other primary type of programming error detection method, involves evaluating a computer program based on its behavior during execution. Runtime checking involves executing the computer program with a known set of inputs and verifying the program results against the expected outcome. The set of test inputs, execution conditions, and expected results is called a "test case." Often, in order to help locate errors, a printout or trace showing the value of selected variables at different points in the program's execution is produced.

Although simple in principle, the usefulness of runtime checking is limited by the complexity of the computer program. A tremendous amount of effort is involved in designing, making, and running test cases. Even after such extensive effort, the error detection capability of runtime checking is limited to the code paths executed by the specific set of inputs chosen. In all but the most simple computer programs, it is generally impractical to execute all possible control flow paths. Furthermore, runtime checking requires that a computer program be complete and ready for execution. Since a function must be executed to be analyzed, testing a function apart from incorporating it into a complete program requires the additional effort of building a program shell that provides the function with the necessary environment for execution.

One method to overcome the deficiencies of typical programming error detection methods is described in U.S. Pat. Nos. 5,694,539 (issued Dec. 2, 1997); 5,857,071 (issued Jan. 5, 1999); 5,968,113 (issued Oct. 19, 1999); and U.S. Pat. No. 6,079,031 (issued Jun. 20, 2000), all entitled "Computer Process Resource Modeling Method and Apparatus," issued on, respectively, and U.S. Pat. No. 5,790,778, entitled "Simulated Program Execution Error Detection Method and Apparatus," issued on Aug. 4, 1998, and assigned to Intrinsa Corp. of Mountain View, Calif. The disclosures of the above-identified issued U.S. patents are hereby incorporated herein by reference. This programming error detection method analyzes components of computer programs by tracking the effect of program instructions on the state of program resources. Each resource has a prescribed behavior represented by a number of states and transitions between states.

The difficulties in detecting errors in computer programs is compounded in the case of systems that consist of several individual programs that interact with each other. In such systems, the operation of each individual program is potentially affected by events occurring in the other programs that interact with it. Existing program analysis techniques operate either on the entire code of a single program or a subset thereof; such techniques are known respectively as whole-program analysis and partial-program analysis techniques. Both types of techniques can automatically identify defects in some number of source files. Whole-program analysis techniques are more effective, but partial-program analysis techniques can give useful results on subsets of code.

However, most modern software is written as a collection of interacting programs. Since the programs interact, they cannot be analyzed independently—the behavior of one program influences the behavior of other programs in the system. Further, the order in which programs must be analyzed to give useful results is informed by the dependency relationships between the programs, i.e., the calling relationships between them. The results of the analysis of one program must be used as inputs for the analysis of other programs that interact with it.

Program analysis tools typically allow the developer to describe "external behavior" that can in practice be used to specify the behavior of another component. Certain program analysis tools allow the description of a specific component's external behavior to be generated automatically by analyzing the component in question. For example, the PREfix analysis tool uses models and provides a complex mechanism to allow users to specify which models are used and produced in an analysis. The PC-Lint analysis tool uses libraries known as "lint libraries" and provides a comparably complex mechanism. By invoking the tool on different parts of the code in a specific order and furnishing the appropriate specification of which external behavior to generate and use for the analysis of individual components, it is possible to use a whole-program analysis tool to perform cross-program analysis, i.e., analysis of multiple programs that interact with each other.

However, this approach is not practical on a large system that has a large number of components. For example, the WINDOWS 2000 operating system build process generates over 3000 different programs, in addition to other programs provided in binary form. There are myriad dependency relationships between these programs. It is not practical to specify these dependencies to a program analysis tool manually, nor to manually determine the correct order in which the program analysis tool should be invoked on the individual programs.

A variety of techniques can be used to determine cross-program dependencies. For example, these relationships may be known a priori based on the design of the system. As an alternative, they can be determined manually by inspecting the code. They may also be determined automatically by analyzing how the system is built. In some cases, they may also be determined by analyzing the executable programs comprising the system.

What is needed is a method of using the information about cross-program dependencies to automatically invoke the program analysis tool appropriately on the individual programs. "Appropriately" includes providing the correct external behavior specifications, and determining the correct order in which programs should be analyzed.

A number of approaches have been proposed for solving the cross-program analysis problem. These approaches typically attempt to approximate the correct solution, but introduce potentially serious errors into the analysis.

One approach is to ignore the fact that there are multiple programs and instead treat the entire system as a single "program." This approach introduces some potentially serious inaccuracies into simulation. Certain assumptions that are safe to make in whole-program and partial-program analysis cannot be safely made in cross-program analysis. For example, in whole- and partial-program analysis in the C programming language, a safe to assume that there is only one function with a given name because if that were not the case, the program would not be executable. This restriction is enforced by the linker. However, there is no such restriction when dealing with multiple programs. Since all known whole- and partial-program analysis tools build this assumption in, treating the multiple programs as a single program results both in large numbers of inaccurate assumptions about the structure of the program, and in the incorrect appearance that a substantial portion of the code can be safely excluded from analysis.

Another approach is to treat the programs as independent. This approach, however, fails to consider any issues related to the interaction between components. Still another approach involves attempting to manually specify the interactions between components. This approach does not scale well beyond a handful of components. It is difficult both to manually determine the dependencies between components, and to manually specify these dependencies for the tool.

Due to the inadequacy of existing program analysis techniques to analyze highly complex systems of individual programs, a need continues to exist for a programming error detection method that considers the behavior of executed program instructions and that can perform cross-program analysis on such complex systems.

SUMMARY OF THE INVENTION

Defect detection in a software system made of multiple computer programs is facilitated by using information about cross-program interactions and dependency relationships between programs to analyze the individual programs in such a way that the behavior of the system as a whole is accurately represented.

In one implementation, a program analysis tool is invoked to analyze related programs of a software system according to an advantageous order. Based on identified dependency relationships between related programs of the software system, an order in which to analyze the plurality of related programs is determined. The program analysis tool then analyzes the plurality of related programs in this order.

In another implementation, the dependency relationships are used to determine an order in which to analyze the programs. The program analysis tool is then used to analyze the related programs in that order. Analysis of a program is informed by a result of a preceding analysis of another program.

Still other implementations include computer-readable media and apparatuses for performing the above-described methods. The above summary of the present invention is not intended to describe every implementation of the present invention. The figures and the detailed description that follow more particularly exemplify these implementations.

DETAILED DESCRIPTION

In the following detailed description of various embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
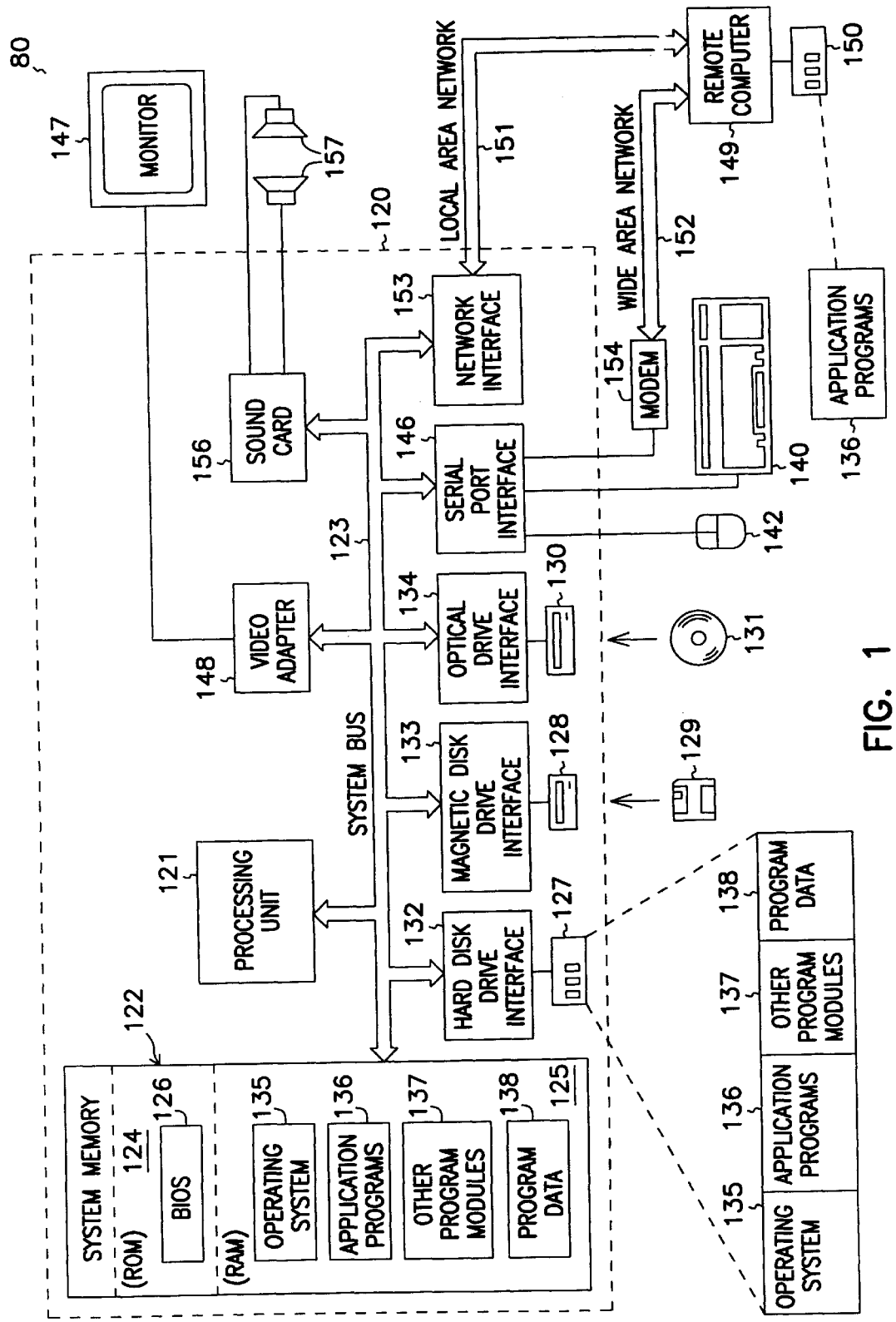
FIG. 1 illustrates a simplified overview of an example embodiment of a computing environment for the present invention.

FIG. 1 illustrates a hardware and operating environment in conjunction with which embodiments of the invention may be practiced. The description of FIG. 1 is intended to provide a brief, general description of suitable computer hardware and a suitable computing environment with which the invention may be implemented. Although not required, the invention is described in the general context of computer-executable instructions, such as program modules, being executed by a computer, such as a personal computer (PC). This is one embodiment of many different computer configurations, some including specialized hardware circuits to analyze performance, that may be used to implement the present invention. Generally, program modules include routines, programs, objects, components, data structures, etc. that perform particular tasks or implement particular abstract data types.

Moreover, those skilled in the art will appreciate that the invention may be practiced with other computer-system configurations, including hand-held devices, multiprocessor systems, microprocessor-based or programmable consumer electronics, network personal computers ("PCs"), minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows a computer arrangement implemented as a general-purpose computing or information-handling system 80. This embodiment includes a general purpose computing device such as personal computer (PC) 120, that includes processing unit 121, a system memory 122, and a system bus 123 that operatively couples the system memory 122 and other system components to processing unit 121. There may be only one or there may be more than one processing unit 121, such that the processor computer 120 comprises a single central-processing unit (CPU), or a plurality of processing units, commonly referred to as a parallel processing environment. The computer 120 may be a conventional computer, a distributed computer, or any other type of computer; the invention is not so limited.

In other embodiments other configurations are used in the personal computer 120. System bus 123 may be any of several types, including a memory bus or memory controller, a peripheral bus, and a local bus, and may use any of a variety of bus architectures. The system memory 122 may also be referred to as simply the memory, and it includes read-only memory (ROM) 124 and random-access memory (RAM) 125. A basic input/output system (BIOS) 126, stored in ROM 124, contains the basic routines that transfer information between components of personal computer 120. BIOS 126 also contains start-up routines for the system.

The personal computer 120 typically includes at least some form of computer-readable media. Computer-readable media can be any available media that can be accessed by the personal computer 120. By way of example, and not limitation, computer readable media may comprise computer storage media and communication media. Computer storage media includes volatile and nonvolatile, removable and non-removable media implemented in any method or technology for storage information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the personal computer 120. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included in the scope of computer readable media.

By way of example, the particular system depicted in FIG. 1 further includes a hard disk drive 127 having one or more magnetic hard disks (not shown) onto which data is stored and retrieved for reading from and writing to hard-disk-drive interface 132, magnetic disk drive 128 for reading from and writing to a removable magnetic disk 129, and optical disk drive 130 for reading from and/or writing to a removable optical disk 131 such as a CD-ROM, DVD or other optical medium. The hard disk drive 127, magnetic disk drive 128, and optical disk drive 130 are connected to system bus 123 by a hard-disk drive interface 132, a magnetic-disk drive interface 133, and an optical-drive interface 134, respectively. The drives 127, 128, and 130 and their associated computer-readable media 129, 131 provide nonvolatile storage of computer-readable instructions, data structures, program modules and other data for personal computer 120.

In various embodiments, program modules are stored on the hard disk drive 127, magnetic disk 129, optical disk 131, ROM 124 and/or RAM 125 and may be moved among these devices, e.g., from hard disk drive 127 to RAM 125. Program modules include operating system 135, one or more application programs 136, other program modules 137, and/or program data 138. A user may enter commands and information into personal computer 120 through input devices such as a keyboard 140 and a pointing device 42. Other input devices (not shown) for various embodiments include one or more devices selected from a microphone, joystick, game pad, satellite dish, scanner, or the like. These and other input devices are often connected to the processing unit 121 through a serial-port interface 146 coupled to system bus 123, but in other embodiments they are connected through other interfaces not shown in FIG. 1, such as a parallel port, a game port, or a universal serial bus (USB) interface. A monitor 147 or other display device also connects to system bus 123 via an interface such as a video adapter 148. In some embodiments, one or more speakers 157 or other audio output transducers are driven by sound adapter 156 connected to system bus 123. In some embodiments, in addition to the monitor 147, system 80 includes other peripheral output devices (not shown) such as a printer or the like.

In some embodiments, the personal computer 120 operates in a networked environment using logical connections to one or more remote computers such as remote computer 149. Remote computer 149 may be another personal computer, a server, a router, a network PC, a peer device, or other common network node. Remote computer 149 typically includes many or all of the components described above in connection with personal computer 120; however, only a storage device 150 is illustrated in FIG. 1. The logical connections depicted in FIG. 1 include local-area network (LAN) 151 and a wide-area network (WAN) 152, both of which are shown connecting the personal computer 120 to remote computer 149; typical embodiments would only include one or the other. Such networking environments are commonplace in offices, enterprise-wide computer networks, Intranets and the Internet.

When placed in a LAN networking environment, the personal computer 120 connects to local network 151 through a network interface or adapter 153. When used in a WAN networking environment such as the Internet, the personal computer 120 typically includes modem 154 or other means for establishing communications over network 152. Modem 154 may be internal or external to the personal computer 120 and connects to system bus 123 via serial-port interface 146 in the embodiment shown. In a networked environment, program modules depicted as residing within the personal computer 120 or portions thereof may be stored in remote-storage device 150. Of course, the network connections shown are illustrative, and other means of establishing a communications link between the computers may be substituted.

EXAMPLE EMBODIMENTS

According to various embodiments of the present invention, a whole-system analysis tool receives as input a list of programs or components making up the system to be analyzed and a list of cross-program dependencies. The cross-program dependencies can be specified as a text file or as records in a database.

These dependencies are then analyzed to determine which program analyses must be applied, the appropriate order in which the analyses should be applied, and the inputs and outputs of each program analysis. In one embodiment, the order is computed in a single pass; in another embodiment, the analysis tool instead determines which program should be analyzed next at any point in time. The inputs and outputs of each program analysis are passed to the individual program analyses in the form of configuration files, for example, for the PREfix analysis tool. The program analysis tool is then invoked on each individual program to be analyzed. Alternatively, the inputs and outputs of each program analysis could be stored for subsequent processing instead of immediately invoking the program analyzer.

Figure 2:
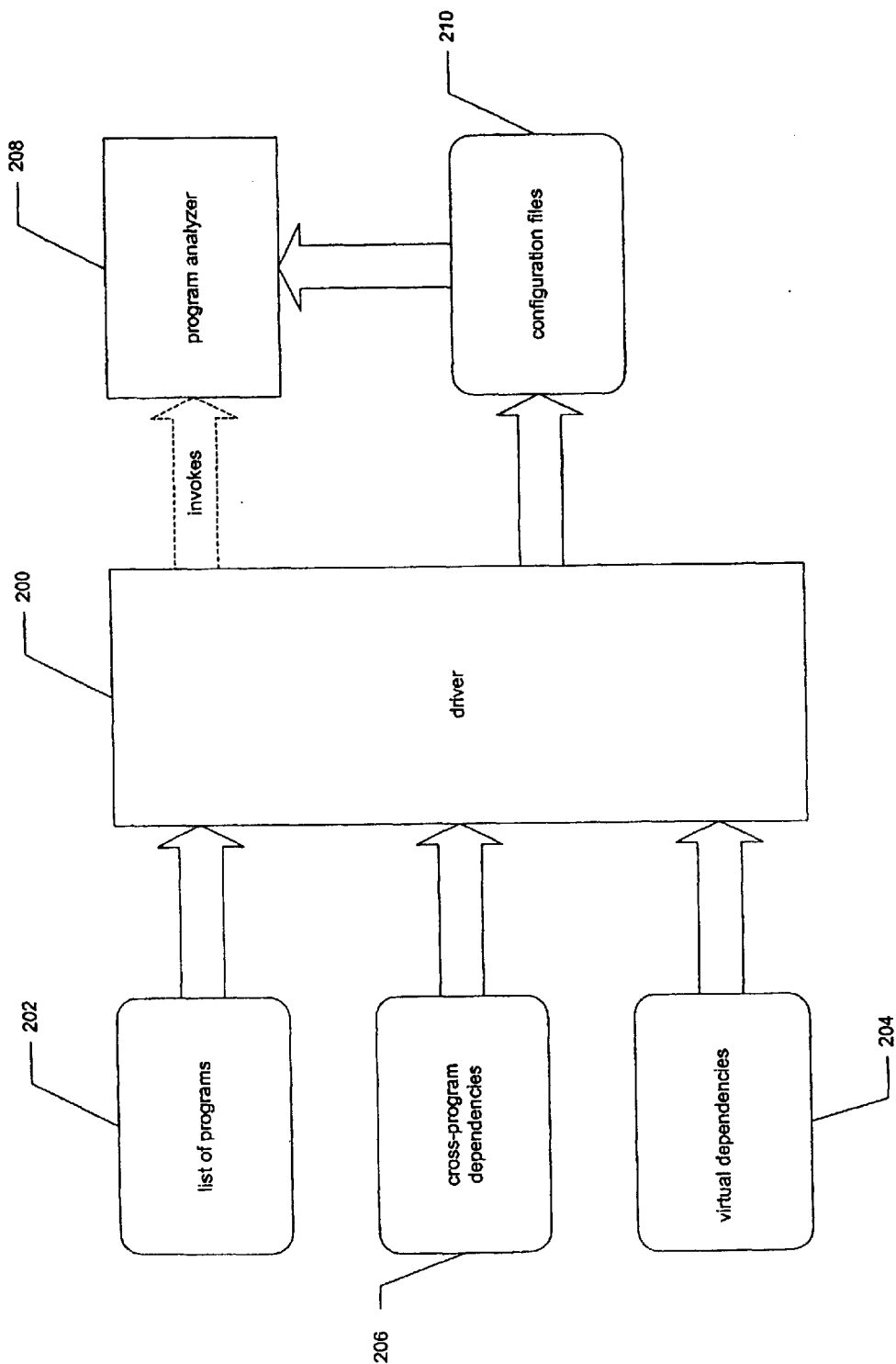
FIG. 2 depicts an example implementation of a whole-system analysis tool, according to a particular embodiment of the present invention.
Figure 3:
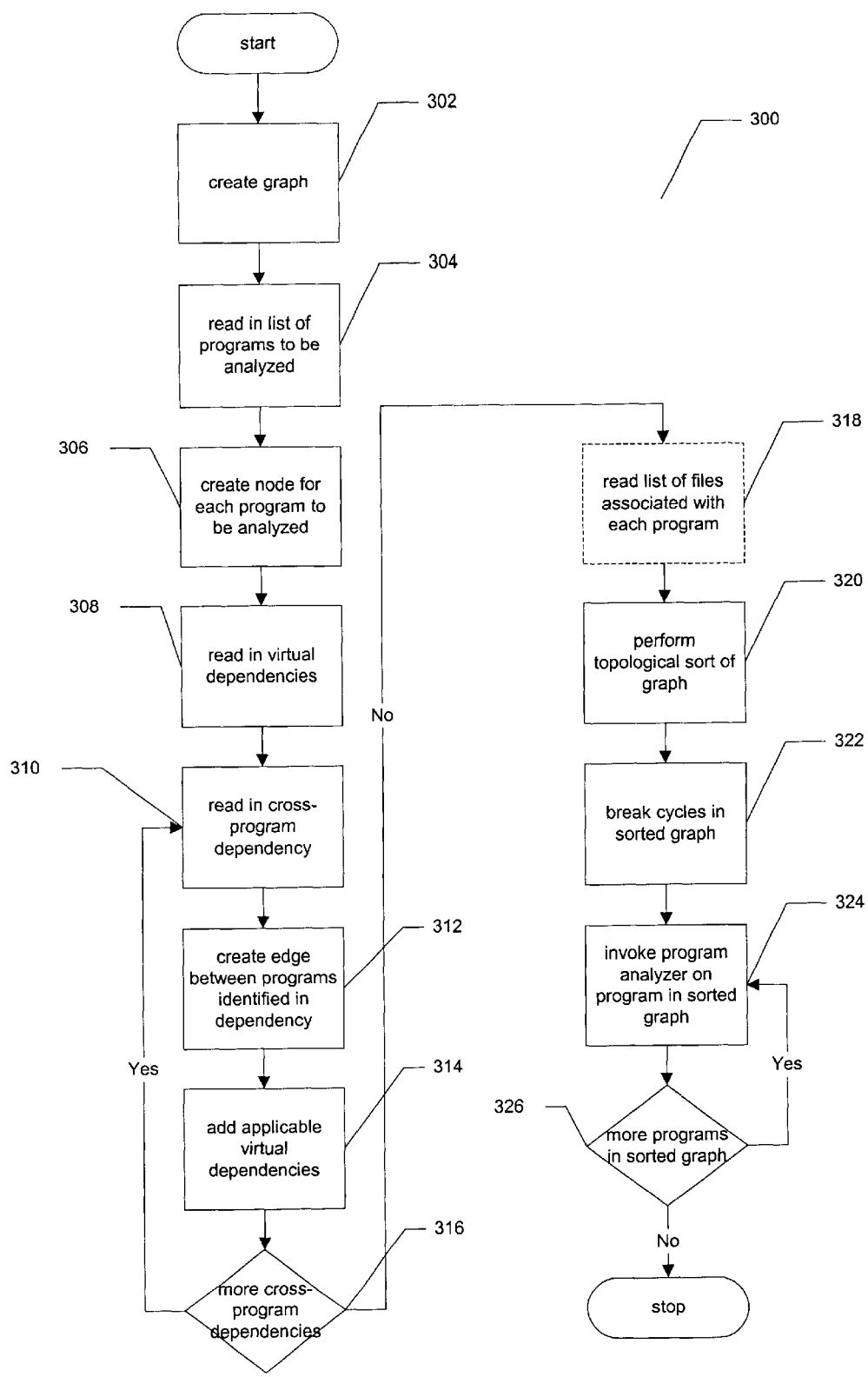
FIG. 3 is a flowchart illustrating operation of a whole-system analysis tool, according to another particular embodiment of the present invention.

FIG. 2 conceptually depicts one example implementation of a whole-system analysis tool, according to one embodiment of the present invention. The operation of the whole-system analysis tool is illustrated in FIG. 3. A driver 200 of FIG. 2 first creates a graph G, which is a data structure type that is well-known in the art, at a block 302 of FIG. 3. Next, the driver 200 reads in a list of programs 202 to be analyzed at a block 304. At a block 306, the driver 200 creates a node N in the graph G for each program to be analyzed. According to one embodiment, the programs specified by giving the full name of the directory in which the executable program is built. As an alternative, the program may be specified by giving the fully-qualified filename of the executable program image file. In one embodiment, these are read in from textual files. In another, they are read from a database.

Next, at a block 308, the driver 200 reads in the list of "dependency-equivalent relationships" 204, which are specified as a list of pairs of programs. These relationships are defined by a developer and are used to generate additional dependency relationships that may be useful for the purposes of program analysis even if not explicitly present in the underlying software. For example, if a function f1 in program SHELL includes a call to a function f2 in program NTDLL, and function f2 in NTDLL in turn contains only a call to a similarly-named function f2 in program KERNEL, there is a dependency relationship between program SHELL and program NTDLL, and a dependency relationship between program NTDLL and program KERNEL. These relationships may be represented as:

SHELL:NTDLL

NTDLL:KERNEL

In some situations, however, it may be advantageous to treat the program analysis as if function f1 in SHELL directly called function f2 in KERNEL. For example, function f2 in NTDLL may be implemented as an assembly-language stub, and the program analysis tool may be unable to analyze assembly language; in this case, more accurate results will result by omitting function f2 in NTDLL from the analysis, instead treating function f1 as if it calls function f2 in KERNEL. In this case, an equivalent of a dependency relationship exists between the shell and the kernel:

SHELL:NTDLL

SHELL:KERNEL

The list of dependency-equivalent relationships 204 specifies that NTDLL is equivalent to KERNEL for purposes of determining the programs between which dependencies exist, such that whenever a dependency on NTDLL is encountered, a dependency on KERNEL is inserted either in place of or in addition to the dependency on NTDLL.

Next, the system reads in an entry from a list of cross-program dependencies 206, as depicted at a block 310. Cross-program dependencies maybe determined, for example, by tracking the invocations of the compiler, linker, and library programs that were used to build the programs being analyzed in order to determine the relationships between component programs of the system. One such technique for tracking these invocations is by "intercepting" the calls to the compiler, linker, and library programs in order to produce log entries that are subsequently analyzed to determine the cross-dependency relationships.

Each cross-program dependency is defined between two programs that are represented by nodes N in the graph G that was created in connection with block 302. For each dependency, an edge E is created in the graph G between the two nodes, for example, $N_1$ and $N_2$, that represent the programs identified in the dependency. This process is depicted at a block 312. In one embodiment, cross-program dependencies are specified as pairs of depending and depended-on programs. As each cross-program dependency is read in, the dependency-equivalent relationship list is checked to determine whether there are any applicable inferred dependencies. Any such inferred dependencies are also added as edges E in the graph G at a block 314. At a decision block 316, the system determines whether any other cross-program dependencies are specified in the list. If so, flow returns to block 310, and the next dependency is read in. It should be noted that the dependency-equivalent relationship list can be checked after all cross-program dependencies are read in, rather than as each dependency is read in.

In one particular embodiment, the system optionally reads in a list of the files associated with each program at a block 318. The dashed lines of block 318 in FIG. 3 indicate that this process is optional and is omitted in some embodiments of the present invention. For example, if the PREfix analysis tool is used to perform the program analysis, these files include the parse tree files associated with the object files that were used to create each program. In one example embodiment, the list of files includes a list of pairs of a program and an associated file. The system uses this information later in invoking a program analyzer 208.

Next, at a block 320, the system performs a topological sort of the graph G using the set of edges E as the relation for ordering. Topological sorting is performed using any of a variety of well-known algorithms as described, for example, in Aho et al., *Design and Analysis of Computer Algorithms*, published in 1974 by the Addison-Wesley Publishing Company of Reading, Mass. Performing the topological sort causes the nodes N to be ordered in such a way that, as a general rule, any depended-on node precedes the nodes that depend on it. The exception to this rule involves dependency cycles, e.g., program A depends on program B, and program B depends on program A. In one embodiment, a complete topological sort of the graph G is performed in one step. In another embodiment, the topological sort is performed incrementally by maintaining a ready queue and pushing elements onto it as appropriate.

At a block 322, any dependency cycles that were encountered in the graph G are broken by removing an arbitrarily-selected dependency. The dependency cycles may be resolved using more complex methods, but it has been found that arbitrarily selecting dependencies to be removed produces adequate results.

Next, at a block 324, the program analyzer 208 is invoked on a program represented in the graph G. The process of invoking the program analyzer 208 is described more fully below in connection with FIG. 4. At a decision block 326, the system determines whether any programs remain to be analyzed in the graph G. If so, flow returns to the block 324, and the next program in the graph G is analyzed. This process continues until no more programs remain in the graph G to be analyzed.

Figure 4:
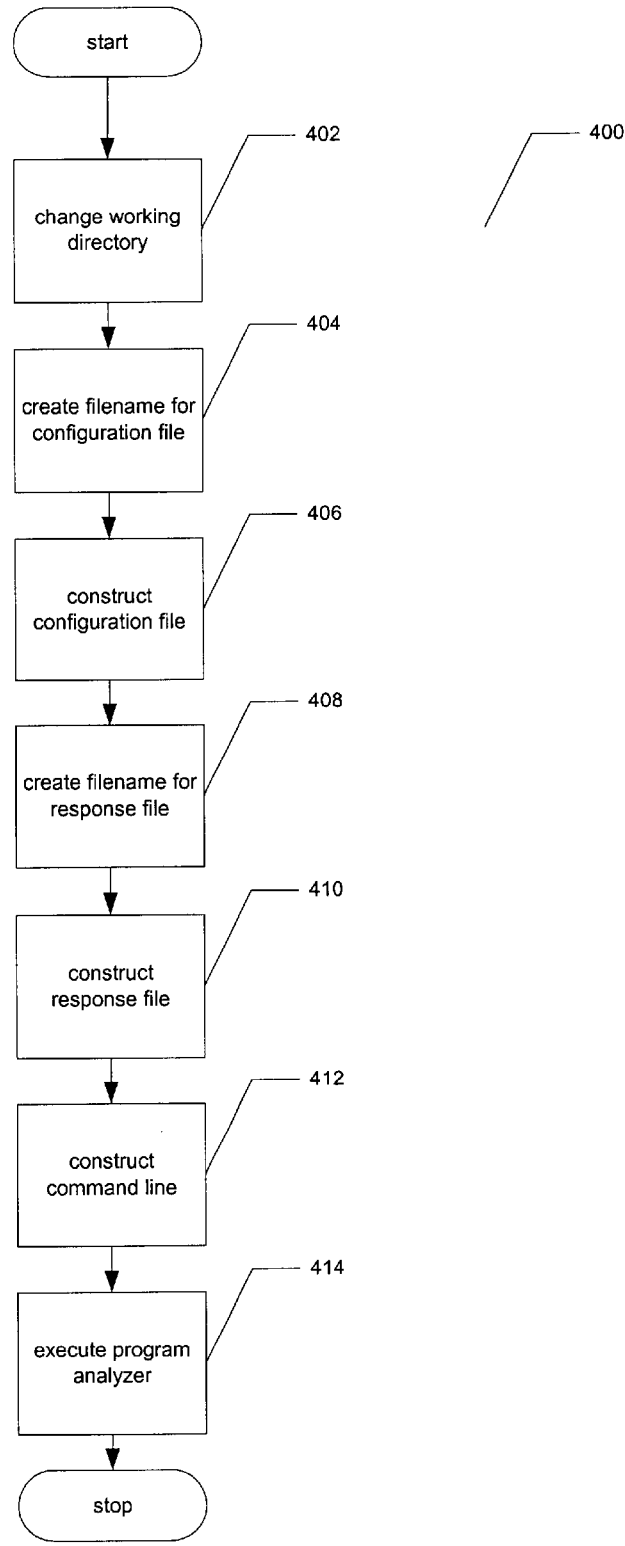
FIG. 4 is a flowchart depicting an example method of invoking a program analyzer, according to another embodiment of the present invention.

FIG. 4 depicts an example method 400 of invoking the program analyzer 208 to analyze a program in the graph G. This method 400 is applicable, for example, when the PREfix analysis tool is used as the program analyzer 208. At a block 402, the current working directory is changed to the appropriate directory for the program being analyzed. Next, at a block 404, a filename is created for a configuration file 210 of FIG. 2. The configuration file 210 is used to specify how the program analyzer 208 should behave when it analyzes the program. For example, the configuration file 210 specifies what types of errors should be logged, and to which directory they should be logged. Other configuration options include the resident directories of the library and linker programs. At a block 406, the configuration file 210 is constructed. This process includes using the dependency information to specify a model search path option. Specifically, when the program analyzer 208 analyzes a given program P, the configuration file 210 instructs the program analyzer 208 to, for each depended-on program P1, add P1\Auto to the model search path.

Next, at a block 408, a filename is created for a response file, which is then, at a block 410, constructed with the names of the parse tree files for the program being analyzed, as read in connection with the optional block 318 of FIG. 3. A command line is then constructed at a block 412 to invoke the program analyzer 208. If the PREfix analysis tool is used as the program analyzer 208, this command line takes the form:

prefix-prefix_opt . . . -config CF @ RF where CF and RF denote the names of the configuration file 210 and the response file, respectively. Issuing the command causes the program analyzer 208 to be executed, as depicted at a block 414 using, for example, the Win32 CreateProcess system call. The system then waits for the program analyzer 208 to finish analyzing a module before it begins analyzing a dependent module by using, for example, the Win32 WaitForSingleObject call. Analysis of independent programs can be performed in parallel, however, so that any number of independent programs can be analyzed simultaneously.

In a particular embodiment of the present invention, the analysis of a program is informed by the results of analyzing a previously-analyzed program. For example, in one implementation, analyzing a program produces an output file, which is subsequently read as input to the analysis of another program of the system, which may or may not be a dependent program.

By determining an optimal order in which the several programs making up a software system should be analyzed to best approximate the behavior of the system as a whole, the whole-system program analysis techniques of the present invention produce an accurate analysis of even large, complex software systems. Consequently, defect detection in such systems is facilitated.

While the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms, such as a computer program encoded in a machine-readable medium, such as a CD-ROM, magnetic medium, ROM or RAM, or in an electronic signal. Further, as used in the claims herein, the term "module" shall mean any hardware or software component, or any combination thereof.

What is claimed is:

1. A computer-implemented method for invoking a program analysis tool, the method comprising:

determining an order in which to analyze a plurality of related programs of a software system as a function of at least one identified dependency relationship between the related programs wherein the at least one identified dependency relationship is identified by a driver automatically intercepting at least one call to one or mote programs used to build the related programs;

receiving a list of developer-specified dependency-equivalent relationships;

inferring at least one dependency relationship as a function of a dependency-equivalent relationship;

supplementing the at least one identified dependency relationship with the at least one inferred dependency relationship; and causing the program analysis tool to analyze the plurality of related programs in the determined order whereby dynamic effects of executing programs are considered in analysis of the programs without actually executing any of the programs analyzed.

2. The method of claim 1, further comprising receiving a list of cross-program dependencies specifying dependency relationships between pairs of related programs wherein the cross-program dependencies are determined by automatically intercepting the at least one call to the one or more programs used to build the related programs.

3. The method of claim 2, wherein the list of cross-program dependencies is stored as a text file.

4. The method of claim 2, wherein the list of cross-program dependencies is stored as a plurality of records in a database.

5. The method of claim 1, further comprising substituting the at least one inferred dependency relationship in place of the at least one identified dependency relationship.

6. The method of claim 1, wherein the one or more programs used to build the related programs comprise at least one of a compiler program, a linker program, and a library program.

7. The method of claim 1, further comprising constructing a graph having a plurality of nodes and a plurality of edges, each edge connecting a pair of nodes, each node representing one of the plurality of related programs.

8. The method of claim 7, further comprising creating an edge corresponding to each identified dependency relationship.

9. The method of claim 7, further comprising referencing a list of dependency-equivalent relationships to identify at least one applicable dependency-equivalent relationship between a pair of related programs.

10. The method of claim 9, further comprising creating an edge connecting the nodes representing the pair of related programs in the at least one applicable dependency-equivalent relationship.

11. The method of claim 7, further comprising receiving a list of files associated with each of the related programs.

12. The method of claim 11, further comprising generating a response file as a function of the received list of files.

13. The method of claim 7, further comprising performing a topological sort of the graph.

14. The method of claim 13, wherein the topological sort is performed in a single iteration.

15. The method of claim 13, wherein the topological sort is performed by:
maintaining a queue having a plurality of elements corresponding to the nodes of the graph; and
iteratively updating an ordering of the elements of the queue.

16. The method of claim 7, further comprising breaking a dependency cycle in the graph by removing a selected dependency relationship.

17. The method of claim 16, further comprising arbitrarily selecting the dependency relationship to be removed.

18. The method of claim 1, further comprising generating a configuration file as a function of the identified dependency relationships.

19. The method of claim 18, wherein the configuration file specifies a model search path option.

20. A computer-implemented method for analyzing a software system that comprises a plurality of related programs, the method comprising:
inferring at least one dependency relationship in the software system between a plurality of related programs as a function of a dependency-equivalent relationship;
determining an order in which to analyze the plurality of related programs as a function of at least one identified dependency relationship between the related programs wherein the at least one identified dependency relationship is identified by a driver automatically tracking invocations of at least one of a compiler program, a linking program, and a library program used to build the related programs and wherein the at least one identified dependency relationship includes the at least one inferred dependency relationship; and
using a program analysis tool to analyze the related programs in the determined order, wherein analysis of a program is informed by a result of a preceding analysis of another program.

21. The method of claim 20, further comprising storing a plurality of inputs to and outputs from analysis of a program.

22. The method of claim 20, further comprising:
receiving a list of cross-program dependencies specifying dependency relationships between pairs of related programs wherein the list of cross-program dependencies is determined by automatically tracking the invocations of at least one of the compiler program, the linking program, and the library program used to build the related programs; and
receiving a list of developer-specified dependency-equivalent relationships.

23. The method of claim 22, further comprising constructing a graph having a plurality of nodes and a plurality of edges, each edge connecting a pair of nodes, each node representing one of the plurality of related programs.

24. The method of claim 23, further comprising creating edges corresponding to the identified dependency relationships and to the inferred dependency relationships.

25. The method of claim 23, further comprising performing a topological sort of the graph.

26. The method of claim 23, further comprising breaking a dependency cycle in the graph by removing an arbitrarily-selected dependency relationship.

27. A computer-readable medium having stored thereon computer-executable programs comprising:
a program analyzer; and
a driver, configured to
determine an order in which to analyze a plurality of related programs of a software system as a function of at least one identified dependency relationship between the related programs wherein the driver identifies the at least one identified dependency relationship by automatically intercepting at least one call to one or more programs used to build the related programs;
receive a list of developer-specified dependency-equivalent relationships;
infer at least one dependency relationship as a function of a dependency-equivalent relationship;
substitute the at least one inferred dependency relationship in place of the at least one identified dependency relationship; and
cause the program analyzer to analyze the plurality of related programs in the determined order whereby dynamic effects of executing programs are considered in analysis of the programs without actually executing any of the programs analyzed.

28. The computer-readable medium of claim 27, wherein the driver is further configured to receive a list of cross-program dependencies specifying dependency relationships between pairs of related programs and determine the cross-program dependencies by automatically intercepting the at least one call to the one or more programs used to build the related programs.

29. The computer-readable medium of claim 28, wherein the list of cross-program dependencies is stored as a text file.

30. The computer-readable medium of claim 28, wherein the list of cross-program dependencies is stored as a plurality of records in a database.

31. The computer-readable medium of claim 27, wherein the driver is further configured to supplement the at least one identified dependency relationship with the at least one inferred dependency relationship.

32. The computer-readable medium of claim 27, wherein the one or more programs used to build the related programs comprise at least one of a compiler program, a linker program, and a library program.

33. The computer-readable medium of claim 27, wherein the driver is further configured to construct a graph having a plurality of nodes and a plurality of edges, each edge connecting a pair of nodes, each node representing one of the plurality of related programs.

34. The computer-readable medium of claim 33, wherein the driver is further configured to create an edge corresponding to each identified dependency relationship.

35. The computer-readable medium of claim 33, wherein the driver is further configured to reference a list of dependency-equivalent relationships to identify at least one applicable dependency-equivalent relationship between a pair of related programs.

36. The computer-readable medium of claim 35, wherein the driver is further configured to create an edge connecting the nodes representing the pair of related programs in the at least one applicable dependency-equivalent relationship.

37. The computer-readable medium of claim 33, wherein the driver is further configured to receive a list of files associated with each of the related programs.

38. The computer-readable medium of claim 37, wherein the driver is further configured to generate a response file as a function of the received list of files.

39. The computer-readable medium of claim 33, wherein the driver is further configured to perform a topological sort of the graph.

40. The computer-readable medium of claim 39, wherein the topological sort is performed in a single iteration.

41. The computer-readable medium of claim 39, wherein the topological sort is performed by:
   maintaining a queue having a plurality of elements corresponding to the nodes of the graph; and
   iteratively updating an ordering of the elements of the queue.

42. The computer-readable medium of claim 33, wherein the driver is further configured to break a dependency cycle in the graph by removing a selected dependency relationship.

43. The computer-readable medium of claim 42, wherein the driver is further configured to arbitrarily select the dependency relationship to be removed.

44. The computer-readable medium of claim 27, wherein the driver is further configured to generate a configuration file as a function of the identified dependency relationships.

45. The computer-readable medium of claim 44, the configuration file specifies a model search path option.

46. A computer-readable medium having stored thereon computer-executable programs comprising:
   a program analyzer; and
   a driver, configured to:
     infer at least one dependency relationship between a plurality of related programs of a software system as a function of a dependency-equivalent relationship;
     determine an order in which to analyze the plurality of related programs as a function of at least one identified dependency relationship between the related programs;
     identify the at least one identified dependency relationship by automatically tracking invocations of at least one of a compiler program, a linking program, and a library program used to build the related programs;
     include the at least one inferred dependency relationship as at least part of the at least one identified dependency relationship; and
     use the program analyzer to analyze the related programs in the determined order, wherein analysis of a program is informed by a result of a preceding analysis of another program.

47. The computer-readable medium of claim 46, wherein the driver is further configured to store a plurality of inputs to and outputs from analysis of a program.

48. The computer-readable medium of claim 46, wherein the driver is further configured to:
   receive a list of cross-program dependencies specifying dependency relationships between pairs of related programs;
   determine the list of cross-program dependencies by automatically tracking the invocations of at least one of the compiler program, the linking program, and the library program used to build the related programs; and
   receive a list of developer-specified dependency-equivalent relationships.

49. The computer-readable medium of claim 48, wherein the driver is further configured to construct a graph having a plurality of nodes and a plurality of edges, each edge connecting a pair of nodes, each node representing one of the plurality of related programs.

50. The computer-readable medium of claim 49, wherein the driver is further configured to create edges corresponding to the identified dependency relationships and to the inferred dependency relationships.

51. The computer-readable medium of claim 49, wherein the driver is further configured to perform a topological sort of the graph.

52. The computer-readable medium of claim 49, wherein the driver is further configured to break a dependency cycle in the graph by removing an arbitrarily-selected dependency relationship.

53. A computer arrangement executed by computer hardware and embodied in at least one of computer firmware and the computer hardware, the computer arrangement comprising:
   a program analyzer; and
   a driver, configured to
   determine an order in which to analyze a plurality of related programs of a software system as a function of at least one identified dependency relationship between the related programs wherein the driver identifies the at least one identified dependency relationship by automatically intercepting at least one call to one or more programs used to build the related programs;
   receive a list of developer-specified dependency-equivalent relationships;
   infer at least one dependency relationship as a function of a (dependency-equivalent relationship;
   supplement the identified dependency relationship with the at least one inferred dependency relationship; and
   cause the program analyzer to analyze the plurality of related programs in the determined order whereby dynamic effects of executing programs are considered in analysis of the programs without actually executing any of the programs analyzed.

54. The computer arrangement of claim 53, wherein the driver is further configured to receive a list of cross-program dependencies specifying dependency relationships between pairs of related programs and determine the cross-program dependencies by automatically intercepting the at least one call to the one or more programs used to build the related programs.

55. The computer-readable medium of claim 28, wherein the list of cross-program dependencies is stored as a text file.

56. The computer arrangement of claim 54, wherein the list of cross-program dependencies is stored as a plurality of records in a database.

57. The computer arrangement of claim 53, wherein the driver is further configured to substitute an inferred dependency relationship in place of an automatically identified dependency relationship.

58. The computer arrangement of claim 53, wherein the one or more programs used to build the related programs comprise at least one of a compiler program, a linker program, and a library program.

59. The computer arrangement of claim 53, wherein the driver is further configured to construct a graph having a plurality of nodes and a plurality of edges, each edge connecting a pair of nodes, each node representing one of the plurality of related programs.

60. The computer arrangement of claim 59, wherein the driver is further configured to create an edge corresponding to each identified dependency relationship.

61. The computer arrangement of claim 59, wherein the driver is further configured to reference a list of dependency-equivalent relationships to identify at least one applicable dependency-equivalent relationship between a pair of related programs.

62. The computer arrangement of claim 61, wherein the driver is further configured to create an edge connecting the nodes representing the pair of related programs in the at least one applicable dependency-equivalent relationship.

63. The computer arrangement of claim 59, wherein the driver is further configured to receive a list of files associated with each of the related programs.

64. The computer arrangement of claim 63, wherein the driver is further configured to generate a response file as a function of the received list of files.

65. The computer arrangement of claim 59, wherein the driver is further configured to perform a topological sort of the graph.

66. The computer arrangement of claim 65, wherein the topological sort is performed in a single iteration.

67. The computer arrangement of claim 65, wherein the topological sort is performed by:

maintaining a queue having a plurality of elements corresponding to the nodes of the graph; and iteratively updating an ordering of the elements of the queue.

68. The computer arrangement of claim 59, wherein the driver is further configured to break a dependency cycle in the graph by removing a selected dependency relationship.

69. The computer arrangement of claim 68, wherein the driver is further configured to arbitrarily select the dependency relationship to be removed.

70. The computer arrangement of claim 53, wherein the driver is further configured to generate a configuration file as a function of the identified dependency relationships.

71. The computer arrangement of claim 70, wherein the configuration file specifies a model search path option.

72. A computer arrangement executed by computer hardware and embodied in at least one of computer firmware and the computer hardware, the computer arrangement comprising:

a program analyzer; and a driver, configured to infer at least one dependency relationship between a plurality of related programs of a software system as a function of a dependency-equivalent relationship;

determine an order in which to analyze the plurality of related programs as a function of at least one identified dependency relationship between the related programs;

identify the at least one identified dependency relationship by automatically tracking invocations of at least one of a compiler program, a linking program, and a library program used to build the related programs;

include the at least one inferred dependency relationship as at least part of the at least one identified dependency relationship; and use the program analyzer to analyze the related programs in the determined order, wherein analysis of a program is informed by a result of a preceding analysis of another program.

73. The computer arrangement of claim 72, wherein the driver is further configured to store a plurality of inputs to and outputs from analysis of a program.

74. The computer arrangement of claim 72, wherein the driver is further configured to:

receive a list of cross-program dependencies specifying dependency relationships between pairs of related programs;

determine the list of cross-program dependencies by automatically tracking the invocations of at least one of the compiler program, the linking program, and the library program used to build the related programs; and receive a list of developer-specified dependency-equivalent relationships.

75. The computer arrangement of claim 74, wherein the driver is further configured to construct a graph having a plurality of nodes and a plurality of edges, each edge connecting a pair of nodes, each node representing one of the plurality of related programs.

76. The computer arrangement of claim 75, wherein the driver is further configured to create edges corresponding to the identified dependency relationships and to the inferred dependency relationships.

77. The computer arrangement of claim 75, wherein the driver is further configured to perform a topological sort of the graph.

78. The computer arrangement of claim 75, wherein the driver is further configured to break a dependency cycle in the graph by removing an arbitrarily-selected dependency relationship.

* * * * *